United States Patent [19]
Evans

[11] Patent Number: 4,660,317
[45] Date of Patent: Apr. 28, 1987

[54] APPARATUS FOR SUPPORTING AND AGITATING A FISHING ROD

[76] Inventor: T. B. Keith Evans, 2070 Northbrook Drive, Sidney, British Columbia, Canada, V8L 4J5

[21] Appl. No.: 838,462

[22] Filed: Mar. 11, 1986

[51] Int. Cl.⁴ ............................................. A01K 87/00
[52] U.S. Cl. ..................................... 43/19.2; 43/21.2; 43/26.1
[58] Field of Search ...................... 43/19.2, 17.1, 21.2, 43/26.1, 17

[56] References Cited

U.S. PATENT DOCUMENTS

| | | | |
|---|---|---|---|
| 3,031,790 | 5/1962 | Duryea | 43/19.2 |
| 3,550,302 | 12/1970 | Creviston | 43/19.2 |
| 3,691,668 | 9/1972 | Strebig | 43/19.2 |
| 3,839,810 | 10/1974 | Lagasse | 43/19.2 |
| 3,863,379 | 2/1975 | Kobayashi | 43/19.2 |
| 4,100,695 | 7/1978 | Blanchard | 43/19.2 |
| 4,251,939 | 2/1981 | Tiede | 43/19.2 |

Primary Examiner—Nicholas P. Godici
Assistant Examiner—Kurt Rowan
Attorney, Agent, or Firm—Carver & Co.

[57] ABSTRACT

Apparatus supports fishing rod which extends from a housing secured to gunwale of a boat. The housing has an output shaft with a rod holder which carries the fishing rod. A motor within the housing rotates the output shaft through a variable control device which controls speed, direction and limits of rotation of the motor and thus stroke of the fishing rod. The apparatus has position sensors which are responsive to position of the output shaft and thus reflect position of fishing rod. The device also has a load sensor which is responsive to excessive load on the output shaft and disconnects power to the motor when torque on the shaft exceeds a predetermined value. At this stage the fisherman can remove the fishing rod from the holder, and play the fish in the normal manner. The apparatus permits a lone fisherman to jig, while leaving his hands free to control his boat.

20 Claims, 5 Drawing Figures

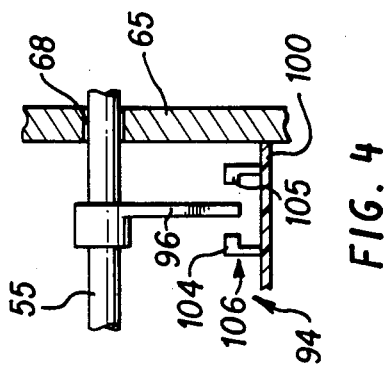
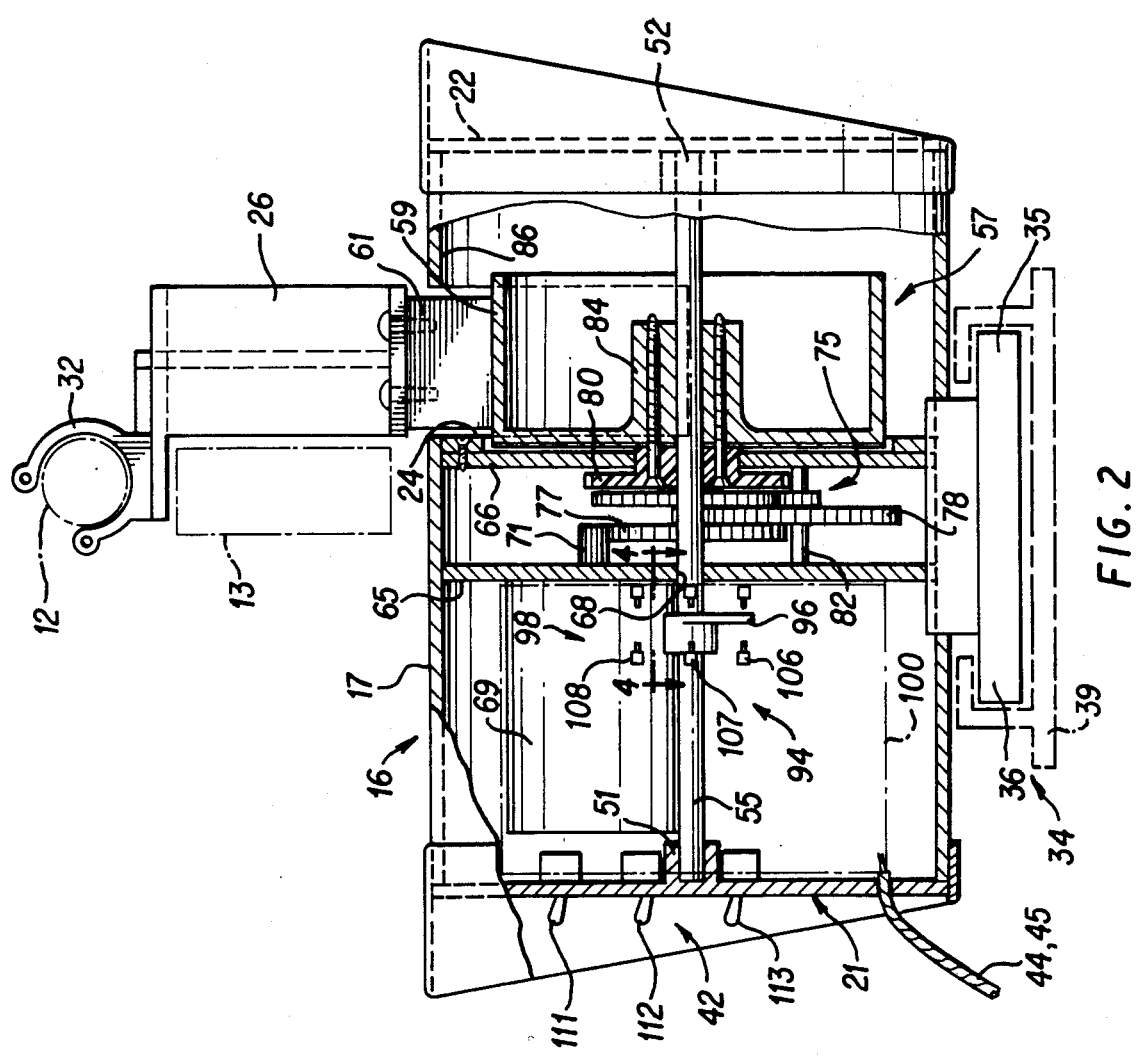

APPARATUS FOR SUPPORTING AND AGITATING A FISHING ROD

BACKGROUND OF THE INVENTION

1. Field of the Invention

The invention relates to an apparatus for automatically holding and jigging a fishing rod, particularly adapted for, but not limited to, sports fishermen.

2. Prior Art

Many devices are known for oscillating or "jigging" a fish fishing rod to impart a desired movement to the bait or lure attached to a line extending from the rod. Some devices have been fairly successful, but commonly have disadvantages such as excessive motor, gear and linkage noise, and relatively high initial cost and complexity, the complexity tending to increase the cost of maintenance and sometimes contributing to premature malfunction. Some devices have relatively complex mechanical linkage which is exposed to the harsh marine environment, and thus is prone to corrosion, seizure and premature failure. Attempts to protect the interior mechanism and controls of prior art devices have not always been successful, and delicate switches, sliding linkages, bearings and electrical contacts have suffered accordingly. Typical prior art devices are shown in U.S. Pat. Nos. 2,758,407 (Speidell); 3,839,810 (Lagasse); 3,961,668 (Streibig); 4,020,582 (Thelen); and 4,100,695 (Blanchard). While all of the above devices provide means to automatically agitate a fishing rod, most of the devices exhibit some of the disadvantages discussed above. Some devices use a solenoid actuated by a contact breaker, which would be prone to erosion of the electrical contacts. Some devices agitate the fishing rod through a horizontal arc, as opposed to a vertical arc. Some fishermen consider that sweeping the rod through a horizontal arc does not produce a desired action of the lure, and thus is not so effective in attracting fish. Other devices signal to the fisherman when the fish srikes, but do not disconnect the motor from action, and thus if the fisherman cannot immediately stop the device, excessive load on the rod can cause permanent damage to the apparatus by overloading the motor due to weight of the fish. Other devices have a fixed speed of action, or sweep of the rod, and thus are not easily adjustable to suit the particular lure, fishing conditions or desired species of fish.

SUMMARY OF THE INVENTION

The present invention reduces some of the difficulties and disadvantages of the prior art by eliminating complex mechanical linkages and substituting electronic circuits to obtain the desired variability of fishing rod motion. The mechanical aspects of the device are relatively simple, and most of the mechanical components can be fabricated from corrosion resistant plastic, thus eliminating the problems of corrosion and wear of mechanical linkages of the prior art. The relatively few mechanical components of the device are housed within a rugged, relatively waterproof housing which protects the apparatus from dirt and the corrosive marine environment. The electronic aspects of the invention are relatively simple and provide a sufficiently wide range of motion to accommodate many different types of lures encountered with sports fishing for a wide variety of fish species. The rod is positioned on the device so that weight of the reel attached adjacent the end of the rod assists in raising the rod during an upwards stroke. Furthermore, the apparatus has means to accommodate inertia of the rod at the end of its stroke, such that during stroke reversal, any tendency of the rod to "overshoot" its normal limit of stroke does not damage the apparatus, and thus in most circumstances an excessively loaded rod can exceed its normal stroke limits without permanent damage.

A first embodiment of the apparatus according to the invention has a housing, a rod holder, a motor, power and control means, and position and load sensing means. The housing has journalling means and an output shaft journalled for rotation in the journalling means. The rod holder cooperates with the output shaft and is adapted to carry a fishing rod. The motor cooperates with the housing and the output shaft to rotate the shaft relative to the housing as required. The power and control means cooperate with the motor to control speed and direction of rotation of the motor, and hence speed and direction of rotation of the output shaft defining stroke of the fishing rod. The position sensing means is responsive to position of the output shaft and hence reflect position of the fishing rod, the sensing means cooperating with the power and control means to control direction of rotation of the shaft. The load sensing means is responsive to excess load on the output shaft and cooperates with the power and control means to disconnect power to the motor when torque on the shaft exceeds a predetermined value.

A second embodiment of the apparatus has a housing, an output shaft and drum, a rod holder and a motor and gearing assembly. The housing has a generally tubular body portion and a pair of end plates sealing and fitted adjacent opposite ends of the body portion. The end plates have axially aligned shaft journals, and the body portion has a clearance opening extending peripherally over a portion of the body portion. The output shaft and drum are fitted within the casing, and the output shaft is journalled for rotation within the aligned journals. The drum is mounted on the shaft to rotate therewith so that a particular portion of the drum is exposed through the clearance openings. A rod holder mounted on the particular portion of the drum passes outwardly from the drum through the clearance opening. Sufficient clearance is provided between the clearance opening and the rod holder to permit limited angular oscillatory motion of the rod holder relative to the casing. The motor and gearing assembly is mounted within the casing and cooperates with the output shaft to rotate the shaft. The motor is controlled to produce angular oscillatory motion for the shaft which is transferred to the rod holder and the fishing rod to produce a generally vertical angular oscillatory motion or stroke for the fishing rod.

A detailed disclosure following, related to drawings, describes a preferred embodiment of the invention which is capable of expression in structure other than that particularly described and illustrated.

DESCRIPTION OF THE DRAWINGS

FIG. 2 is a simplified, partially sectioned front elevation of the apparatus, showing some internal details of power and control means, as viewed along the axis of the fishing rod which is partially shown in broken outline, FIG. 4 is a simplified fragmented section on line 4—4 of FIG. 2 showing position sensing means.

DETAILED DISCLOSURE

FIG. 1

Figure 1:
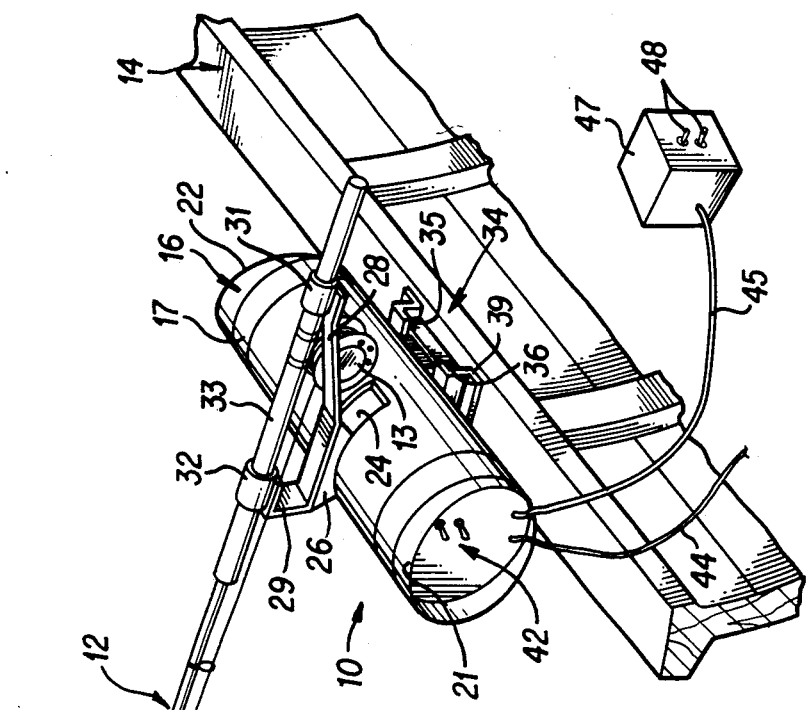
FIG. 1 is a simplified perspective of an apparatus according to the invention, secured to a gunwale of a boat, and shown supporting a fishing rod for jigging.

An apparatus 10 according to the invention supports and agitates a fishing rod 12 carrying a reel 13, the apparatus being releasably secured to a gunwale 14 of a boat. The apparatus has a housing 16 which has a generally tubular body portion 17 and first and second end plates 21 and 22 fitted and sealed adjacent opposite ends of the body portion. The body portion has a clearance opening 24 extending peripherally over a portion of the body portion as will be described. A rod holder 26 extends through the clearance opening 24 and has inner and outer arms 28 and 29 extending in opposite directions and carrying at respective outer ends generally C-shaped clips 31 and 32 to releasably retain a handle 33 of the fishing rod thereon.

The housing 16 has a base portion 34 which has oppositely extending projections 35 and 36. A bracket 39 is secured to the gunwale and has outer portions which are complementary to and receive the projections 35 and 36 so as to secure the apparatus to the gunwale. The apparatus can be easily fitted to the bracket, or removed therefrom by axial movement, and suitable stop means, not shown, are provided to locate the base portion 34 within the bracket 39.

A plurality of manual control switches 42 are provided on the first end plate 21, and first and second electrical leads 44 and 45 pass through the end plate 21 to the interior of the housing. The lead 44 extends to a 12 volt DC power supply, not shown, and the lead 45 extends to a remote manual control unit 47 which has control switches 48 which are duplicates of the control switches 42 on the end plate 21. Thus, the apparatus can be operated either directly using the switches 42, or remotely using the switches 48 on the unit 47, means being provided in the controls to prevent contradicting signals to the apparatus. As will be described, the apparatus 10 oscillates the rod in a generally vertical plane through a stroke or an arc of swing 50 of about 45 degrees.

Figure 3:
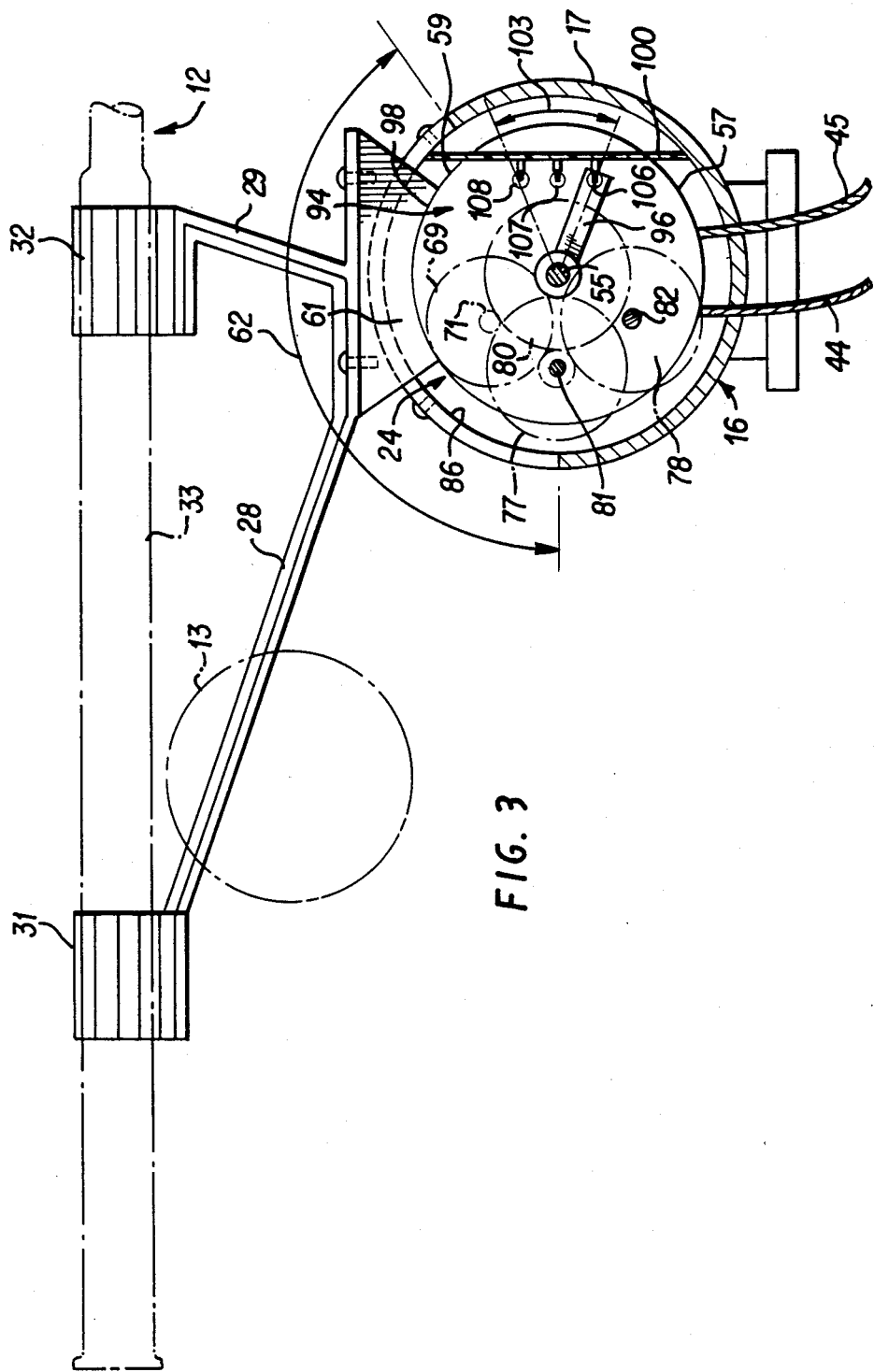
FIG. 3 is a simplified fragmented end elevation of the apparatus partially sectioned and with some portions removed to show some internal detail more clearly, as viewed laterally of the axis of the fishing rod which is partially shown in broken outline.

FIGS. 2 through 4, with reference to FIG. 1

The end plates 21 and 22 have axially aligned first and second shaft journals 51 and 52, and an output shaft 55 is journalled for rotation within the aligned journals. A generally cylindrical drum 57 is mounted on the shaft to rotate therewith, the drum having a particular portion 59 concentric with the shaft and located so as to be generally adjacent the clearance opening 24 so that the particular portion of the drum is exposed through the clearance opening. Thus, the particular portion of the drum exposed through the clearance opening is generally cylindrical and concentric with the output shaft 55. It is positioned closely to an inner surface 86 of the housing 16 so as to reduce ingress of water through the clearance opening, but clearly, water could pass through this opening as it would not be completely sealed. The particular portion of the drum 59 has a drum surface adjacent the rod holder which extends an amount sufficient to essentially close the opening for the full limit of swinging of the rod holder, thus reducing the chances of solid matter falling into the opening.

An inner portion 61 of the rod holder is secured to the portion 59 of the drum so that the rod holder is mounted on the drum and passes outwardly from the drum through the clearance opening. Sufficient clearance is provided between the clearance opening and the rod opening to permit limited angular oscillatory motion of the rod holder relative to the casing, as will be described, through the arc of swing 50, see FIG. 1. To increase versatility the clearance opening 24 extends over a clearance arc 62 which is about 135 degrees and is sufficient to provide an adequate adjustment of the start and finish of the rod stroke 50, FIG. 1.

The interior of the housing 16 includes first and second axially spaced inner bulkheads 65 and 66 which are sealed against the body portion 17. The bulkhead 65 has a third aligned shaft journal 68 to receive the shaft 55 therein but the bulkhead 66 has a large clearance opening as will be described. Thus, the shaft 55 is journalled in three places along its length and thus is relatively strongly supported to withstand loads of a fishing rod and fish.

An electrical DC motor 69 is secured to the inner bulkhead 65 amd fitted between the bulkhead 65 and the end plate 21. The motor has a motor output pinion 71 which serves as an input to a reduction gearing assembly 75. The reduction gearing assembly 75 has first and second gear wheel combinations 77 and 78 which are generally similar and include concentrically disposed large and small diameter gear wheele. The reduction gearing assembly is relatively conventional and reduces the relatively high output shaft speed of the motor, typically about 3500 RPM, to a relatively slow output speed of the output shaft 55, i.e., typically of about 4 RPM. As in a conventional reduction gear assembly, the relatively small motor pinion 71 drives the large gear of the combination gear 77 which is journalled on a first spindle 81 extending between the bulkheads 65 and 66. The small gear of the combination 77 in turn drives the large gear of the second gearwheel combination 78 which is journalled for rotation on a second spindle 82. The small gear of the second combination 78 similarly drives a large output gearwheel 80 which is secured to a central boss 84 of the drum 57 which extends through the bulkhead 66. Thus, rotation of the gearwheel 80 rotates the drum 57, and with it the rod holder 26. Preferably, a watertight seal (not shown) seals a small gap between the boss 84 and a complementary clearance opening in the bulkhead 66 so as to essentially eliminate any chance of water passing into the space between the first and second inner bulkheads 65 and 66. It is appreciated that water could pass through the clearance opening 24 in the housing, by passing between the drum and the housing, but any water passing in this manner would, in all likelihood, not be able to pass the second bulkhead 66. Consequently, the reduction gear assembly is essentially free from contamination from seawater. In any event, the gearing assembly would be plastic, and thus essentially maintenance free. Clearly, the motor 69 is protected from ingress of water from both sides and the end plates 21 and 22, and bulkheads 65 and 66 can be fitted with O-ring seals to ensure watertight joints.

As seen also in FIG. 1, the reel 13 is mounted adjacent an inner end of the rod 12, on the handle 33. The handle of the rod is gripped in the C-clips 31 and 32, and it can been seen that the reel is connected to the rod on a side of the housing remote from an outer end of the rod, not shown, so that the weight of the reel assists in raising the outer end of the rod on an upward stroke of the rod as will be described. Also, as best seen in FIG. 2, portions of the rod holder are displaced laterally so that the rod 12 and reel 33, shown in broken outline, are displaced laterally from the inner portion 61 of the rod holder so as to be closer to the two journals 51 and 68, so as to reduce bending moment on the output shaft 55. As will be described with reference to FIG. 5, the motor is controlled by a power and control means which can control speed and direction of rotation of the motor, and hence speed and direction of rotation of the output shaft which defines stroke of the fishing rod. The control means cooperate with a position sensing means 94 which is responsive to relative position of the output shaft and the housing, and hence reflects position of the fishing rod relative to the housing as will be described. The sensing means 94 cooperates with the power and control means through the circuit as will be described with reference to FIG. 5.

As best seen in FIG. 3, the position sensing means 94 includes an opaque output arm 96 or position output means which extends radially from the output shaft 55, and a plurality of photo-interrupters 98 which are mounted on a vertical support 100. The photo-interrupters are disposed on a straight line array, although they could be mounted on an arc or curved array concentric with the shaft 55. As seen in FIG. 4, a first photo-interrupter 106 has a transmitter 104 and a receiver 105, which are spaced axially apart, and the an opaque output member or arm 96 is adapted to pass between the transmitter and receiver as the shaft 55 rotates through an arc 103 defined by sweep of the arm. The arc 103 is about 45 degrees and corresponds to the arc 50. As seen in FIG. 3, second and third photo-interrupters 107 and 108 are similarly disposed and spaced-apart adjacent to the arc 103. Thus the array of photo-interrupters is disposed within a plane normal to the output shaft so as to be swept by the output member as the shaft rotates.

Preferably, the present invention has at least two ranges of stroke for the rod, namely a short range and a long range. This requires at least three photo-interrupters which serve as non-contact electrical switches disposed in the switch array having two outer switches 106 and 108 and one inner switch 107 as described. Clearly, as the shaft rotates anti-clockwise as seen in FIG. 3, for the long stroke the arm sweeps in sequence from the first to the second and then to the third switch. In order to obtain the longest stroke of the rod, it is important that switch 107 can be de-energised so that the arm 96 can then sweep through the switch 107 without activating the control. By providing additional switches in the array, in which intermediate switches can be de-energised as required, an even wider variety of stroke lengths and starting and finishing positions can be selected. For simplicity, the present invention is described for three switches only, which provide not only long and short strokes, but stroke startng and finishing variations such as sweeping the rod from a low initial position up to an intermediate position and back down again, or sweeping the rod from the intermediate position, up to a high position and then back down again to the intermediate position. To further vary the starting and finishing positions of the fishing rod stroke, means can be provided to re-position the range of oscillation of the rod. This is attained by providing means to vary the relative angular position of the rod holder 26 and the position sensing means 94. The said angular relationship can be varied by adjusting a locking screw, not shown, which secures the arm 96 to the shaft 55, or the drum 57 to the shaft. Alternatively the array of photo-interrupters 98 could be moved, or the rod holder 26 could be moved relative to the drum 57. The wide difference between the arc of swing 50 of the rod and the clearance arc 62 of the opening 24 accomodates this wide adjustment.

As will be described with reference to FIG. 5, the control switches 42 include a first manual switch 111, which serves as an off/on switch, a second manual switch 112, which is a stroke length adjusting switch, and a third manual switch 113 which is a speed switch to select either fast or slow speed for the rotation of the output shaft 55. The photo-unterrupters or noncontact switches 106 through 108 are mounted on a circuit board which serves as the support 100, and cooperate with motor driving circuitry and control logic and which are described in greater detail with reference to FIG. 5. The circuit board is fitted for ease of access to permit replacement, and can be sealed with corrosion resistant laquer so as to reduce problems in the harsh marine environment.

FIG. 5

The 12 volt DC supply, such as a conventional car battery, is designated 120 and supplies power through the lead 44 to motor driving circuitry 121 and control logic circuitry 123 through an 8 volt logic supply 124. The three manual switches 111, 112 and 113 connect through a user interface board 126 into the control logic circuitry 123 which in turn controls the motor driving circuitry 121. The array 98 of non-contact switches 106 through 108, which are a portion of the position sensing means or sensor 94, provide input to the control logic circuitry 123 which, through the motor driving circuitry 121, controls direction of the motor 69. A load detector 129 is responsive to current drawn by the motor 69 and is adapted to activate an audible alarm 130 should current drawn by the motor exceed a predetermined amount. The load detector has means 128 to adjust sensitivity so as to increase or decrease threshold load which would trigger the audible alarm 130. This permits the apparatus to be used for fishing a wide variety of fish, so as to avoid accidental activation of the alarm for unduly light loads.

The electrical components of the apparatus are susceptible to many variations and the description below relates to one particular application, which has been found successful for fishing fish up to a maximum weight of 20 kgs (45 lbs). The motor driving circuitry 121 has an a H-bridge configuration to avoid conflicting signals. Changing the active arm of the H-bridge configuration changes the direction of rotation of the DC motor as is common practice. The circuitry 121 has power transistors which are protected from high voltage reverse bias breakdown by a free-wheeling diode. Peferably, the motor is a permanent magnet DC type, which has at least 800 gm.cm. (11 oz inches) of torque available and runs with a compatible 12 to 24 volt supply.

The control logic 123 is an CMOS, 4000 series digital logic which has good noise immunity and low power consumption and ensures that only one arm of the H-bridge motor configuration is engaged at a particular time. Outputs of two cross-coupled NAND gates are always in opposite logic states. A 0.1 second R13-C4 delay is activated when one NAND gate goes from low to high, which occurs when the fishing rod reaches an upper point of its travel, that is at the top of the stroke. The delay provides time for the motor to completely stop before the other arm of the H-bridge is activated and reverses the direction of rotation of the motor. Similarly, the other NAND gate output is delayed when it goes from low to high which occurs at the lowest point of the rod stroke, and can last for either 2 seconds or 4 seconds depending on particular connections. A load condition occurs when a fish strikes the line, or when the line is subjected to a load above a maximum selected load. As will be described, a signal from the load detector disables one or both of the outputs so that the motor cannot rotate, which immobilises the fishing rod and gives the fisherman time to disengage the rod to play the fish.

The user interface 126 permits selection of operating conditions for the control logic as follows. The switch 111 is a simple on/off power switch, and the switch 112 is a DPDT switch that allows the user to select either a long stroke or a short stroke. The selection of the stroke length also changes the length of time delay at the bottom of the stroke which is considered desirable for some fishing conditions. The manual switch 113 changes the speed of the stroke by introducing or by-passing a resister, so as to change current to the motor.

The load detector 129 accepts current from either arm of the H-bridge of the motor driving circuitry. The load detector has a comparator having a trip voltage set by a potentiometer, and output of the comparator is normally high. However, when the motor is heavily loaded, such as from the added resistance of a fish, increased current is drawn by the motor and this increases the voltage which switches the output of the comparator to low. This causes the load detector to trigger the alarm and the output from the comparator prevents the motor from turning any further while the alarm sounds. To reset the system, the fisherman would turn off the unit and remove the fishing rod and clear the load, before re-inserting the rod and turning on the unit again. If required, a jack can be provided to allow a remote alarm to be connected which will operate in parallel with the main alarm in response to excessive load.

The photo-interrupters 106 through 108 of the position detectors 128 are configured so as to be normally "on". When there is transmission from the transmitter to receiver, that is when there is no obstruction, output from the photo-interrupters is high, but when blocked by the output arm the photo-interrupter output is changed to low and the change in signal is transmitted to the control logic which then changes direction of rotation of the motor. Clearly, the position of the manual switch 112 determines which of the switches 106 through 108 are activated, so as to determine sweep of the fishing rod.

OPERATION

The bracket 39 is secured to the gunwale 14 of the boat and the apparatus 10 is fitted by sliding the base portion 34 into the bracket, and locating it against axial sliding. The fisherman selects the long or short range of stroke by the second manual switch 112, and the low or high speed of operation of the motor by actuating the third switch 113. When the lure has been fitted and the rod cast following normal practice, the rod is fitted into the holder so that the reel 13 is positioned on a side of the housing remote from the outer end of the rod as shown in FIG. 1. In this way, weight of the reel assists in raising the outer end of the rod on an upward stroke of the rod. The apparatus is switched on with the first manual switch 111 and the motor and gearing assembly cooperate to rotate the shaft in an angular oscillatory motion, which is transferred to the rod holder and then to the fishing rod to produce generally vertical angular oscillatory motion for the fishing rod.

Figure 5:
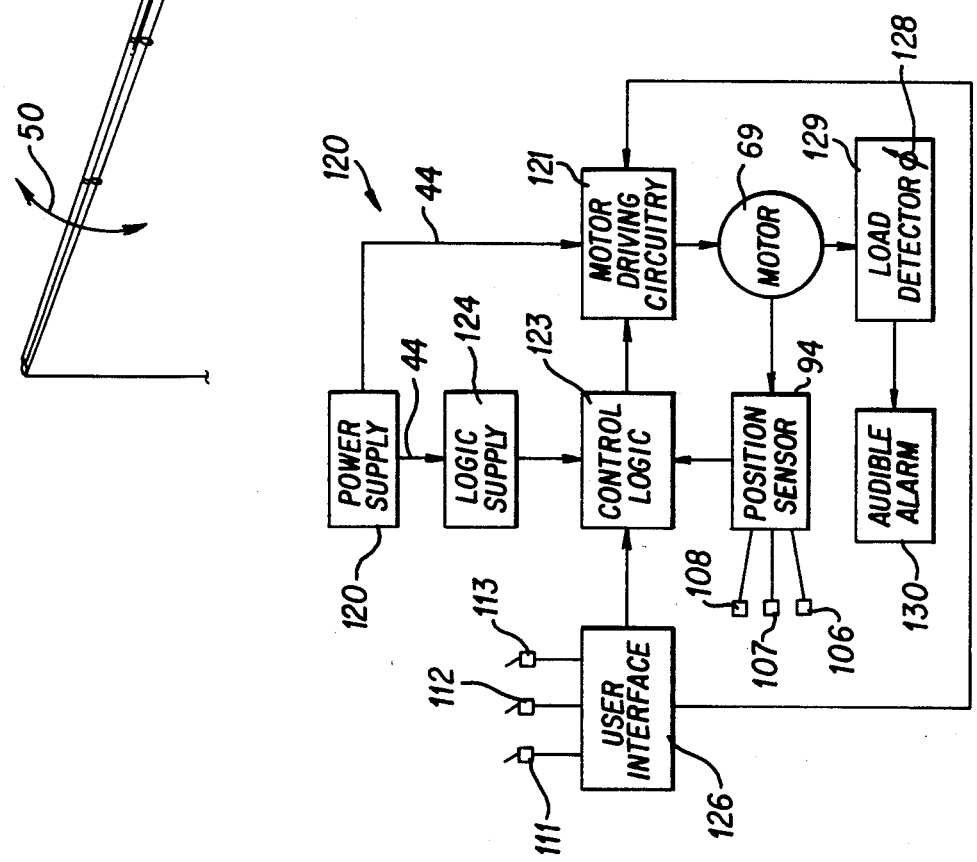
FIG. 5 is a simplified electrical schematic diagram showing main components of the power and control means of the invention.

When a fish strikes, there is an increase in load on the rod which is detected by the load detector 129, FIG. 5, which then sounds the audible alarm 130. The control logic cuts the current to the motor, thus stopping the device. The rod is then removed from the holder, and the fish played in the normal manner. The device can be reset by switching the manual switch 111 off, and then switching it back on.

For a short range of stroke, two adjacent non-contact switches are activated, for example either the switches 108 and 107, or 106 and 107. Thus, as the arm 96 swings past either of the switches, the current to the motor is first stopped, and then reversed, thus reversing direction of the motor until the remaining switch is again activated. To increase the stroke, the intermediate or second switch 107 switch is deactivated, and the remaining outer switch activated, so that the arm can swing completely between the outer switches 106 and 108 without any effect on the switch 107. Thus, the intermediate switch must be deactivated so as to permit the full swing between the two outer switches.

Particularly with a fast sweep with a heavy rod, or when there has been a considerable increase in load on the rod, it is anticipated that the arm 96 will swing past an activated photo-interrupter or non-contact switch before the motor can be stopped. This is due to inertia of the moving components, that is the rod, weight of the fish and drum etc and is termed "over-shooting". This over-shooting can be tolerated as there is no direct contact with the switch itself, and thus over-shooting does not cause any mechanical damage to the switches. This tolerance to over-shooting as above described is a major advantage resulting from use of non-contact switches. A second advantage is that mechanical contact to complete an electrical circuit is not required, as current switching is done electronically, and thus wear, or electrical arcing between electrical contacts is eliminated. This second aspect increases considerably the mechanical contact reliability of the system when compared with mechanical constant switching, for example, such as mechanical limit switches. Other types of non-contact switches can be substituted for the photo-interrupters, for example magnetic proximity switches.

It can be seen that the switch 112 is a manual stroke adjusting switch which cooperates with the non-contact switch array so as to energise a particular pair of non-contact switches which define limits of the stroke. The manual stroke adjusting switch cooperates with the power and control means so as to reverse the direction of rotation of the motor alternately as each non-contact switch of the particular pair is actuated by the position output means, that is the arm 96, at the ends of the stroke. Clearly, the load detector 129 is a load sensing means responsive to excess load on the output shaft which is reflected by excess current drawn by the motor, and cooperates with the power and control means to disconnect power to the motor when torque on the shaft exceeds a predetermined value.

What is claimed is:

1. An apparatus for supporting and agitating a fishing rod, the apparatus having:
   (a) a housing having journalling means and an output shaft journalled for rotation in the journalling means,
   (b) a rod holder cooperating with the output shaft and adapted to carry a fishing rod,
   (c) a motor cooperating with the housing and the output shaft to rotate the shaft relative to the housing as required,
   (d) a power and control means cooperating with the motor to control speed and direction of rotation of the motor and hence speed and direction of rotation of the output shaft defining stroke of the fishing rod,
   (e) position sensing means responsive to relative position of the output shaft and the housing, thus reflecting relative position of the fishing rod, the sensing means cooperating with the power and control means to control direction of rotation of the shaft,
   (f) load sensing means responsive to excess load on the output shaft and cooperating with the power and control means to disconnect power to the motor when torque on the shaft exceeds a predetermined value.

2. An apparatus as claimed in claim 1 in which the position sensing means includes:
   (a) a position output means responsive to relative position of the output shaft and the housing,
   (b) non-contact electrical switches positioned so as to be actuated when the position output means is generally adjacent a particular electrical switch.

3. An apparatus claimed in claim 2 in which:
   (a) the electrical switches are located within the housing,
   (b) the position output means is mounted on the output shaft to sweep past the electrical switches.

4. An apparatus as claimed in claim 2 in which:
   (a) the non-contact electrical switches are disposed in a switch array of at least first, second and third switches arranged in sequence, in which the second switch can be de-energised,
   (b) the position output means can pass in sequence from the first switch to the second and then to the third switch without damage to, or actuation of the second switch,
   so as to permit variation of stroke of the fishing rod.

5. An apparatus as claimed in claim 4 in which:
   (a) the position output means is an output member mounted on the output shaft for rotation therewith,
   (b) the array of switches is disposed within a plane normal to the output shaft so as to be swept by the output member as the shaft rotates.

6. An apparatus as claimed in claim 2 in which:
   (a) the non-contact electrical switches are photo-interrupters, each photo-interrupter having a transmitter and a receiver,
   (b) the position output means is an opaque output member adapted to pass between the transmitter and receiver of each photo-interrupter.

7. An apparatus as claimed in claim 2 further including:
   (a) manual stroke adjusting switches cooperating with the position sensing means and the power and control means so as to selectively activate or energise particular non-contact switches, so as to vary limits of stroke of the rod.

8. An apparatus as claimed in claim 4 further including:
   (a) a manual stroke adjusting switch cooperating with the non-contact switch array so as to energise a particular pair of non-contact switches of the array which define limits of the stroke,
   (b) the manual stroke adjusting switch cooperates with the power and control means so as to reverse the direction of rotation of the motor alternately as each non-contact switch of the particular pair is actuated by the position output means at the ends of the stroke.

9. An apparatus as claimed in claim 1, in which:
   (a) the load sensing means is responsive to current absorbed by the motor, and the excess load on the motor is reflected by excess current absorbed by the motor.

10. An apparatus as claimed in claim 1 further including:
    (a) means to vary speed of the motor so as to vary speed of agitation of the rod.

11. An apparatus as claimed in claim 9 further including:
    (a) means to vary value of the excess load that can disconnect power to the motor.

12. An apparatus as claimed in claim 1 in which:
    (a) the housing has opposite end faces carrying axially aligned shaft journals of the journalling means, the output shaft extending axially of the housing, the housing having an elongated clearance opening therein,
    (b) the motor, the position sensing and the power and control means are installed within the housing, and the rod holder extends through the clearance opening which has a length to accommodate stroke of the rod holder.

13. An apparatus as claimed in claim 1 further including:
    (a) means to re-position range of oscillation of the rod, by varying starting and finishing positions of the stroke of the rod.

14. An apparatus as claimed in claim 13 in which:
    (a) the means to re-position the range of oscillation includes means to vary the relative angular position of the rod holder and the position sensing means.

15. An apparatus for supporting and agitating a fishing rod, the apparatus having:
    (a) a housing having a generally tubular body portion and a pair of end plates sealing and fitted adjacent opposite ends of the body portion, the end plates having axially aligned shaft journals, the body portion having a clearance opening extending peripherally over a portion of the body portion,
    (b) an output shaft and a drum within the housing, the output shaft being journalled for rotation within the aligned journals, the drum being mounted on the shaft to rotate therewith so that a particular portion of the drum is exposed through the clearance opening,
    (c) a rod holder mounted on the particular portion of the drum to pass outwardly from the drum through the clearance opening, sufficient clearance being provided between the clearance opening and the rod holder to permit limited angular oscillatory motion of the rod holder relative to the casing, (d) a motor and gearing assembly mounted within the casing and cooperating with the output shaft to rotate the shaft, the motor being controlled to produce angular oscillatory motion for the shaft which is transferred to the rod holder and the fishing rod to produce a generally vertical angular oscillatory motion or stroke for the fishing rod.

16. An apparatus as claimed in claim 15, in which:
(a) the body portion is cylindrical and the clearance opening extends circumferentially over an arc of approximately about 135 degrees, and has a width which is a relatively close fit to the rod holder,
(b) the particular portion of the drum exposed through the clearance opening is generally cylindrical and concentric with the shaft, and is positioned closely to an inner surface of the housing so as to reduce ingress of water through the clearance opening, the particular portion of the drum having a drum surface adjacent the rod holder which extends an amount sufficient to essentially close the clearance opening for the full limit of swinging of the rod holder.

17. An apparatus as claimed in claim 15 further characterised in that:
(a) the rod holder is mounted on the drum so that a reel connected to the rod is on a side of the housing remote from an outer end of the rod, so that weight of the reel assists in raising the outer end of the rod on an upward stroke of the rod.

18. An apparatus as claimed in claim 15 further including:
(a) means to vary angle of oscillation.

19. An apparatus as claimed in claim 15 further including:
(a) an alarm cooperating with the output shaft and being responsive to torque on the shaft, so as to indicate when a fish strikes.

20. An apparatus as claimed in claim 19 further characterised in that:
(a) the alarm has means to vary the degree of load required to trigger the alarm.

* * * * *